(12) United States Patent
Zheng (10) Patent No.: US 8,902,259 B1
(45) Date of Patent: Dec. 2, 2014

(54) FINGER-FRIENDLY CONTENT SELECTION INTERFACE

(75) Inventor: Lantian Zheng, Mountain View, CA (US)

(73) Assignee: Google Inc., Mountain View, CA (US)

( * ) Notice: Subject to any disclaimer, the term of this patent is extended or adjusted under 35 U.S.C. 154(b) by 982 days.

(21) Appl. No.: 12/648,999

(22) Filed: Dec. 29, 2009

(51) Int. Cl.
*G09G 5/373* (2006.01)

(52) U.S. Cl.
USPC .......................................................... 345/661

(58) Field of Classification Search
CPC ....................................................... G06T 11/60
USPC .......................................................... 345/661
See application file for complete search history.

(56) References Cited

U.S. PATENT DOCUMENTS

| | | | | |
|---|---|---|---|---|
| 5,428,721 | A | * | 6/1995 | Sato et al. .................... 345/650 |
| 5,615,384 | A | * | 3/1997 | Allard et al. .................. 715/800 |
| 5,734,915 | A | * | 3/1998 | Roewer ........................ 715/202 |
| 6,072,494 | A | * | 6/2000 | Nguyen ........................ 715/863 |
| 6,201,548 | B1 | * | 3/2001 | Cariffe et al. ................ 345/620 |
| 6,728,546 | B1 | * | 4/2004 | Peterson et al. ............. 455/462 |
| 7,124,359 | B2 | * | 10/2006 | Suzuki et al. ................ 715/202 |
| 8,150,429 | B1 | * | 4/2012 | Zheng .......................... 455/466 |
| 8,152,621 | B2 | * | 4/2012 | Michels ........................ 463/16 |
| 2003/0190090 | A1 | * | 10/2003 | Beeman et al. .............. 382/284 |
| 2004/0243307 | A1 | * | 12/2004 | Geelen ......................... 701/213 |
| 2005/0264833 | A1 | * | 12/2005 | Hiraoka et al. ............... 358/1.9 |
| 2007/0150842 | A1 | * | 6/2007 | Chaudhri et al. ............ 715/863 |
| 2008/0028298 | A1 | * | 1/2008 | Kaneko ........................ 715/243 |
| 2008/0055616 | A1 | * | 3/2008 | Scott et al. ................... 358/1.9 |
| 2008/0084389 | A1 | * | 4/2008 | Mac ............................. 345/158 |
| 2008/0094371 | A1 | * | 4/2008 | Forstall et al. .............. 345/173 |
| 2008/0186255 | A1 | * | 8/2008 | Cohen et al. ................. 345/8 |
| 2009/0172606 | A1 | * | 7/2009 | Dunn et al. .................. 715/863 |
| 2009/0182501 | A1 | * | 7/2009 | Fyke et al. .................. 701/208 |
| 2009/0197669 | A1 | * | 8/2009 | Michels ........................ 463/20 |
| 2009/0237421 | A1 | * | 9/2009 | Kim et al. .................... 345/661 |
| 2010/0011311 | A1 | * | 1/2010 | Kodosky et al. ............. 715/771 |
| 2010/0104134 | A1 | * | 4/2010 | Wang et al. .................. 382/103 |
| 2010/0114854 | A1 | * | 5/2010 | Lee .............................. 707/707 |
| 2010/0161538 | A1 | * | 6/2010 | Kennedy et al. ............. 706/47 |
| 2010/0162163 | A1 | * | 6/2010 | Wang et al. | |
| 2010/0294938 | A1 | * | 11/2010 | Alameh et al. .............. 250/342 |
| 2010/0299390 | A1 | * | 11/2010 | Alameh et al. .............. 709/204 |
| 2011/0038594 | A1 | * | 2/2011 | Symons et al. .............. 386/224 |
| 2011/0064281 | A1 | * | 3/2011 | Chan ............................ 382/118 |
| 2011/0069180 | A1 | * | 3/2011 | Nijemcevic et al. ........ 348/207.1 |
| 2011/0138295 | A1 | * | 6/2011 | Momchilov et al. ........ 715/740 |
| 2012/0058756 | A1 | * | 3/2012 | Olincy et al. ................ 455/417 |
| 2012/0158458 | A1 | * | 6/2012 | Carter, III ................... 705/7.31 |
| 2013/0207997 | A1 | * | 8/2013 | Berger et al. ................ 345/619 |

* cited by examiner

*Primary Examiner* — Javid A Amini (74) *Attorney, Agent, or Firm* — Shumaker & Sieffert, P.A.

(57) ABSTRACT

Methods and systems for content selection using touchscreens are disclosed. A method for selecting content using a touchscreen includes determining first content displayed at least partially within an area of a touchscreen where the area is defined by a shape drawn on the touchscreen by a user, magnifying the first content on the touchscreen, receiving user input identifying one or more deletable content portions displayed within the first content, and selecting a desired content where the desired content is obtained by removing the deletable content from the first content. Corresponding systems and computer readable media are also disclosed.

19 Claims, 7 Drawing Sheets

FINGER-FRIENDLY CONTENT SELECTION INTERFACE

BACKGROUND

1. Technical Field

Embodiments relate to touchscreen user-interfaces.

2. Background Art

Mobile computing devices are available in many forms. Example mobile computing devices include mobile telephones, smartphones, personal digital assistants, navigation devices, netbook computers, mobile computers, gaming devices, and the like. Many mobile computing devices feature a touchscreen as the only means, or at least a major means, of user interface for display and user input.

Many applications that run on mobile computing devices allow the user to enter user input and select content using the touchscreen interface. However, as the touchscreen interfaces become increasingly smaller, the selection of content through the touchscreen interface becomes more difficult and error-prone.

Touchscreen technology has undergone substantial improvements. However, conventional methods of content selection using a touchscreen, particularly small touchscreens, are still cumbersome for users. For example, using conventional content selection methods, a user would painstakingly point to and select each object, or precisely select an area containing the objects of interest in order to select multiple objects of interest displayed on the touchscreen. Use of a stylus is typically needed for precise selection. Even finger-based touchscreen devices, such as the iPhone from Apple, Inc., require tedious and precise selection where text of interest must be specifically highlighted, often in small print. As the touchscreens become smaller and the content gets increasingly more complex (e.g., text and graphics combined, multicolumn display, framed display, and the like) the content selection becomes increasingly tedious and error-prone. Also, as the range of applications available on touchscreens increase and the need to use information or content across multiple applications increase, more efficient ways of selecting content from one application, for example, to be used in another application, increases.

Therefore, as users perform an increasing range of tasks in the cramped confines of relatively small touchscreen interfaces, more effective access to functions of computing devices and applications should be enabled. Therefore, improved methods and systems for content selection on touchscreen interfaces are desired.

SUMMARY

According to one embodiment, a method for selecting content using a touchscreen is provided. The method includes determining first content displayed at least partially within an area of a touchscreen where the area is defined by a shape drawn on the touchscreen by a user, magnifying the first content on the touchscreen, receiving user input identifying one or more deletable content portions displayed within the first content, and selecting a desired content where the desired content is obtained by removing the deletable content from the first content.

According to another embodiment, a system for selecting content using a touchscreen includes a touchscreen and at least one processor coupled to the touchscreen. The processor is configured to determine first content displayed at least partially within an area of the touchscreen where the area is defined by a shape drawn on the touchscreen by a user, to magnify the first content on the touchscreen, to receive user input identifying one or more deletable content portions displayed within the first content, and to select a desired content where the desired content is obtained by removing the deletable content portions from the first content.

Yet another embodiment is a computer readable medium storing instructions where the instructions when executed cause a processor to select content on a touchscreen using a method. The method includes determining first content displayed at least partially within an area of a touchscreen where the area is defined by a shape drawn on the touchscreen by a user, magnifying the first content on the touchscreen, receiving user input identifying one or more deletable content portions displayed within the first content, and selecting a desired content where the desired content is obtained by removing the deletable content from the first content.

Further features and advantages of various embodiments, as well as the structure and operation thereof, are described in detail below with reference to the accompanying drawings. It is noted that embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to example embodiments which may be illustrated in the accompanying figures. These figures are intended to be illustrative, not limiting.

DETAILED DESCRIPTION

While illustrative embodiments for particular applications are described herein, it should be understood that embodiments are not limited thereto. Those skilled in the art with access to the teachings herein will recognize additional modifications, applications, and embodiments within the scope thereof and additional fields in which the embodiments would be of significant utility.

Overview

Embodiments include methods and systems for providing functionality for content selection on computing devices that incorporate touchscreen interfaces. Touchscreens are incorporated in many computing devices as a means of user-interface. The term "computing device" is used herein to describe any device with at least one computer processor. Embodiments are applicable to any type of computing device that includes a touchscreen user interface. However, certain embodiments are particularly advantageous where the touchscreen is relatively small in size. An embodiment, for example, provides a finger-friendly content selection method for touchscreens that are small in size and thus are prone to inaccurate selection choices. Typically touchscreens, for various reasons such as the size of the touchscreen and the resolution of the displayed content, offer a cumbersome interface to select displayed content such as text. An embodiment can be described as an iterative process by which a user can use his finger, stylus, or other like object, to progressively determine a desired selected content from content that is displayed on the touchscreen. The iterative progressive process of determining the desired selected content may be substantially more efficient and less cumbersome than conventional processes for selecting content on touchscreens.

System for Content Selection Using a Touchscreen

Figure 1:
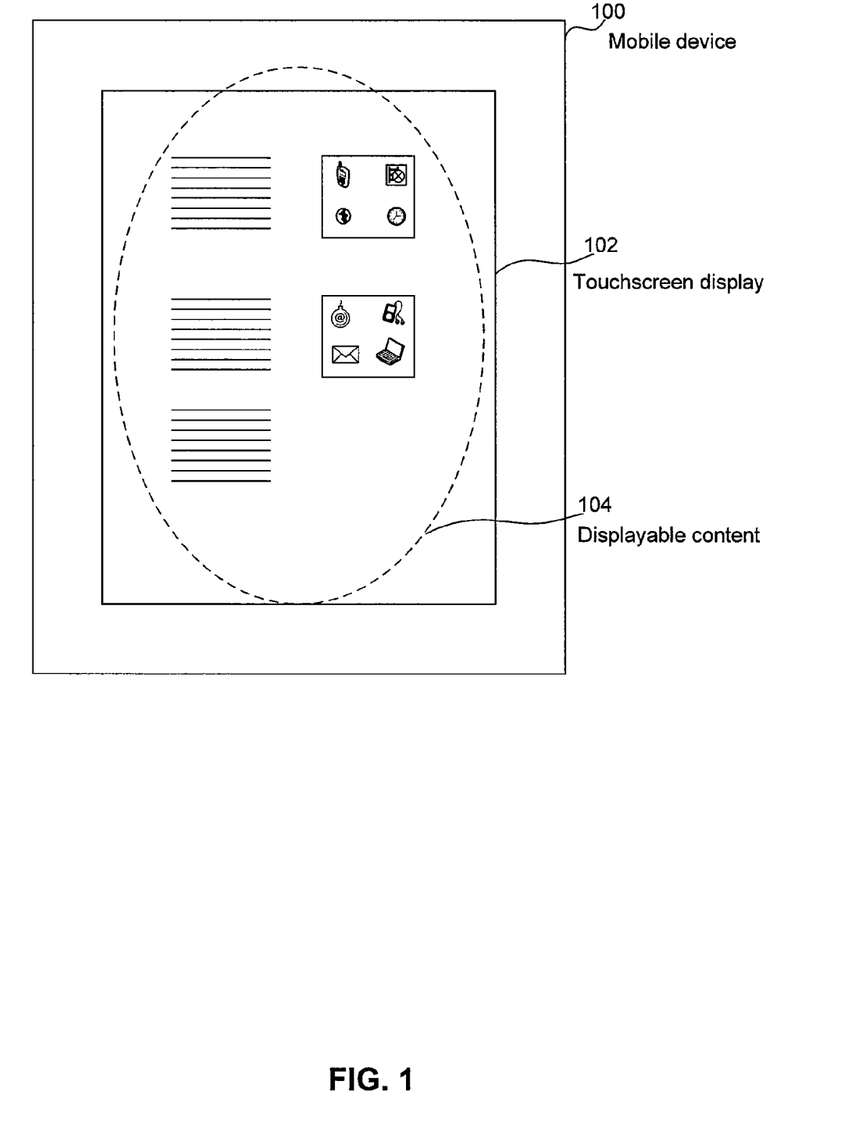
FIG. 1 is a mobile device with a touchscreen displaying content including text and graphics.

FIG. 1 illustrates an example computing device, a mobile device 100, which implements an embodiment. Mobile device 100 can be a personal digital assistant, smartphone, netbook computer, notebook computer, media device (such as portable MP3 music and/or video player), electronic book reader, navigation device, gaming device, and the like. Mobile device 100 is a device with at least one processor that generates displayable content on the processor and receives and processes user input using the processor. For example, using the processor, the content of a web page can be displayed on touchscreen 102 and user input can be received related to the displayed web page. In general it is expected that mobile device 100, at least in some instances, receives user input through a touchscreen 102. Although the embodiments described herein primarily relate to mobile devices and the like, embodiments may also be used in non-mobile devices, such as touch-sensitive monitors and video screens.

Touchscreen 102 can be a conventional touchscreen such as that available on smartphones, tablet computers, gaming devices, and the like. In aspects relevant to certain embodiments, touchscreen 102 enables the display of displayable content on touchscreen 102 and enables the detection of contact upon touchscreen 102 by a finger, stylus, pen, or such object. In another embodiment, touchscreen 102 may detect a finger, stylus, pen or such object when it is in close proximity to the surface of touchscreen 102 even when not making physical contact with touchscreen 102. For example, conventional touchscreens having an optical detection system above the surface of the touchscreen can detect the position of objects such as a finger, stylus, and the like, without requiring physical contact with the surface of the touchscreen. Embodiments are applicable to touchscreens of any type and resolution. However, certain embodiments may be particularly advantageous in touchscreens having a small size. In the following, the terms "touchscreen" and "touchscreen display" are used interchangeably. A touchscreen, as used herein, includes hardware and software associated with the touchscreen's display to display content, and a touch detection system to determine the location and type of contact made with the touchscreen.

FIG. 1 illustrates a mobile device 100 with an incorporated touchscreen 102. As illustrated in FIG. 1, touchscreen 102 can display displayable content 104. Displayable content 104 can include text and graphics objects. Displayable content can be displayed at a variety of resolutions. An example of displayable content 104 may be the rendering of web pages in a browser displayed on touchscreen 102. Web pages, for example, an online newspaper article, can contain many lines of text and graphics. To fit an entire article into the viewable area of touchscreen 102, the displayed resolution of the content can increased, so that the text, for example, appears very small. A user may zoom-in to each area of the displayed content in order to read or to select the text and/or graphics in each respective area. In a conventional device, for example, if a user wants to select a line of text from a web page displayed at a high resolution, the user may first zoom-in the display to a resolution at which the user's fingers or stylus can distinctly highlight the desired text, and then performs the selecting action. An embodiment, for example, can enable the user to simply highlight, by using his fingers to draw a shape on the touchscreen around the area containing the desired text, and then by a process of deselection of unwanted content, to isolate the desired content which can then be used for any of a number of purposes or processing. Embodiments that accomplish this are described below.

Figure 2:
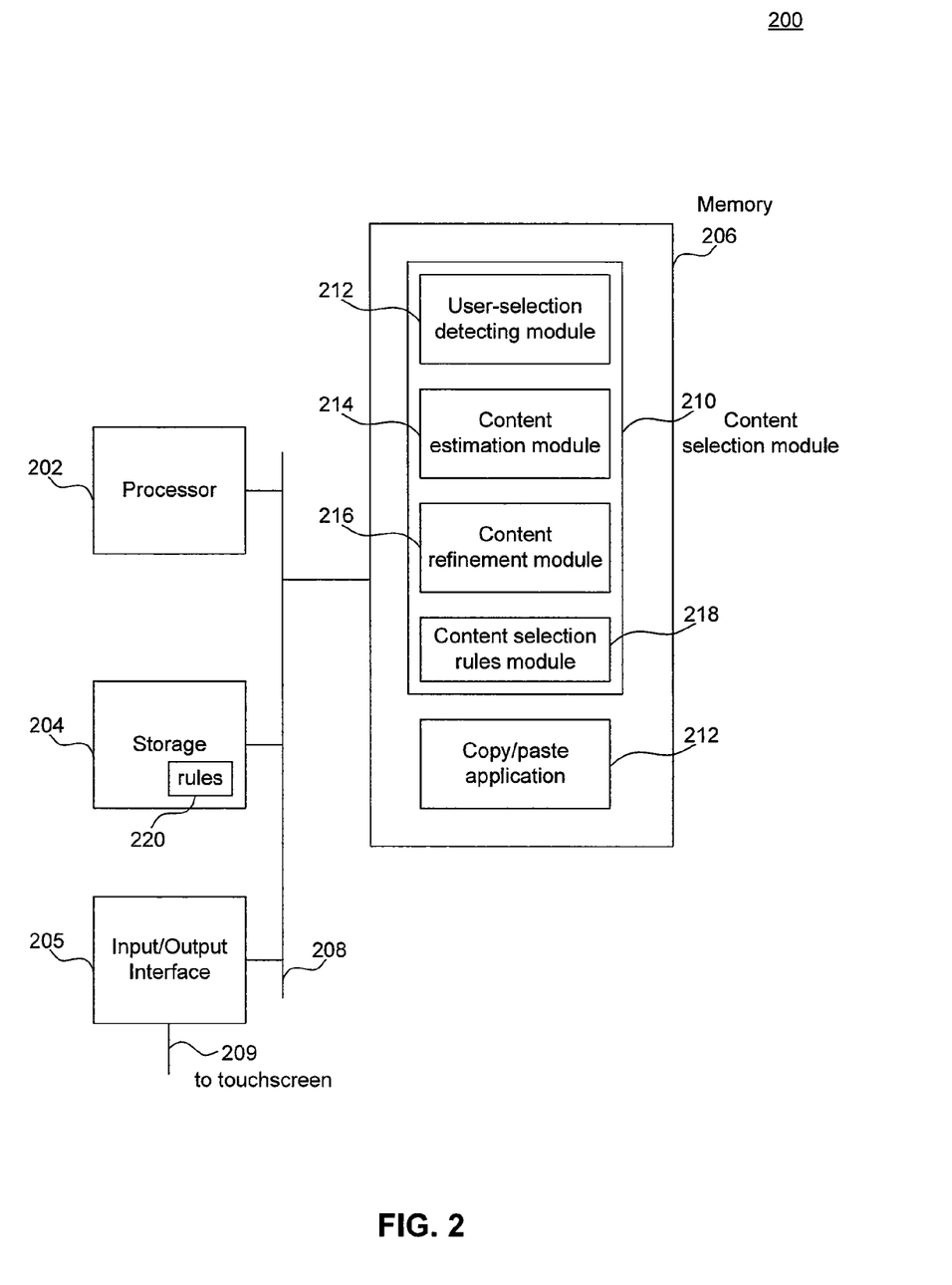
FIG. 2 is a system according to an embodiment.

FIG. 2 illustrates a system 200 according to an embodiment. System 200 includes at least one processor 202, storage 204, input/output interface 205, memory 206, and communication infrastructure 208. System 200 can, for example, be part of a computing device such as mobile device 100.

Processor 202 can include one or more commercially available processors such as those available from Intel or AMD, or custom processors such as field programmable gate arrays (FPGA), digital signal processors (DSP), and application specific integrated circuits (ASIC). Processor 202 controls the operation of components and/or modules of system 200 and may execute processing logic, such as that of content selection module 210. Storage 204 can include one or more removable or non-removable non-volatile digital storage devices such as a hard disk drive, flash memory device, digital video disk, and the like. Removable or non-removable non-volatile digital storage devices are also known as computer readable media. Memory 206 can include one or more of a volatile memory such as dynamic random access memory (DRAM), a static random access memory (SRAM), and the like. Communication infrastructure 208 communicatively couples processor 202 to other components and modules of system 200. Communication infrastructure 208 can include one or more of a bus (e.g. Peripheral Connection Interface bus), switch (e.g. crossbar switch), network (e.g. Ethernet), or like device.

Computer system 200, during operation, may contain the processing logic of content selection module 210 in memory 206. Content selection module 210 includes the processing logic for enabling content selection on a touchscreen according to an embodiment. According to an embodiment, content selection module 210 includes a user-selection detecting module 212, a content estimation module 214, a content refinement module 216, and a content selection rules module 218. User-selection detecting module 212 detects the area selected by the user input. Content estimation module 214 determines an estimated content based on the user selected area. Content refinement module 216 refines the estimated selection to determine content as the user selection. Content selection rules module 218 includes rules based on which the content estimation and content refinement are performed in respective modules 214 and 216.

Figure 3:
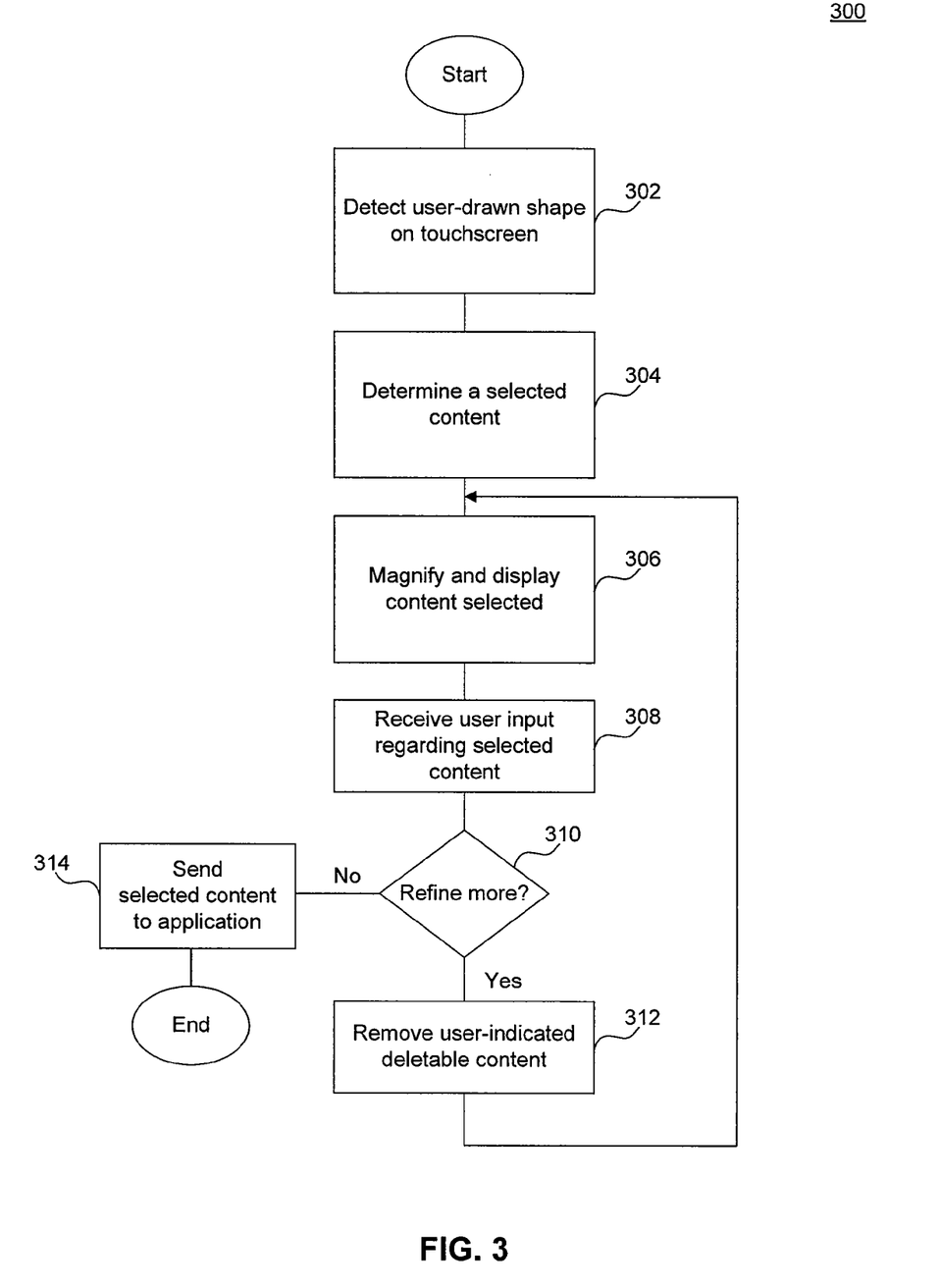
FIG. 3 is a flowchart of a process for content selection using a touchscreen interface, according to an embodiment.
Figure 4:
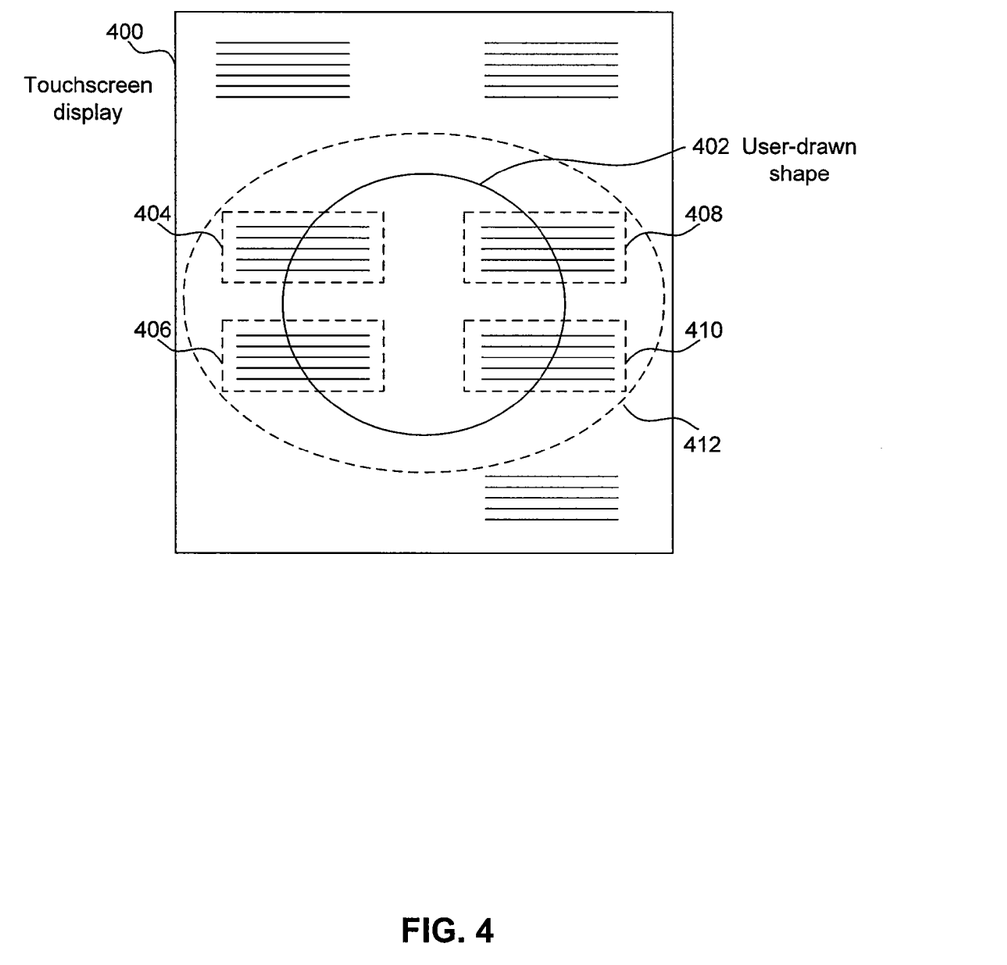
FIG. 4 shows a touchscreen wherein a user-defined shape indicates text content to be selected, according to an embodiment.

The functionalities of modules 212-218, and content selection module 210, are described in relation to flowcharts of FIGS. 3 and 4. In embodiments, modules 212-218 are implemented in software. However, a person of skill in the art would understand that modules 212-218 can be implemented in hardware, firmware, or software, or using a combination thereof, while being consistent with the teachings of this disclosure. Computer system 200 can also include other applications, for example, applications that request and receive content selected by content selection module 210. For example, memory 206 may also include a copy/paste application 212. Copy/paste application 212 can provide copy/paste functionality to a software application such as a word processor or electronic mail.

Storage 304 can include, for example, the source code and/or executable code of content selection module 210 and modules 212-218. Storage 304 can also provide storage for storing content selected by content selection module 210. Storage 304 can also store predefined rules 220 associated with content selection rules module 218.

Input/output interface 205 can include, or provide a hardware or software interface to, one or more input/output devices. For example, a touchscreen such as touchscreen 102 can be coupled to computer system 200 through input/output interface 205. Other input devices such as keyboard or mouse, and/or output devices such as additional displays or storage devices can also be coupled to input/output interface 205.

Method for Content Selection Using a Touchscreen

FIG. 3 illustrates a process 600 to enable a user to select content displayed on a touchscreen, according to an embodiment. Steps 302-304 determine an estimated selected content based on a shape drawn on the touchscreen. In step 302, a user-defined shape on a touchscreen is detected, for example, by user selection detecting module 212. For example, a user may, using a finger, stylus, pen, or like object, draw a circle on the touchscreen 102 of mobile device 100. In one embodiment, the circle may be drawn by making contact with the touchscreen using a finger and then drawing a substantially circular shape on the touchscreen in a continuous motion. In another embodiment, as noted above, the user may draw a shape by having a stylus, finger, or like object, hover just above the touchscreen in the desired shape. The shape can be a circle, rectangle, triangle, oval, or any polygon. The shape can also be any irregular shape that is drawn on the touchscreen.

In an embodiment, touchscreen 102 provides user selection detecting module 212 with parameters defining the shape input by the user, the image of the displayable content displayed on touchscreen 102, and the resolution at which the image of the displayable content is displayed when user input was received defining the shape. In another embodiment, touchscreen 102 determines the area defined by the user defined shape, and provides user selection detecting module 212 with the user defined shape, the image of the displayable content displayed on touchscreen 102, and the resolution at which the image of the displayable content is displayed when the user input was received defining the shape. In yet another embodiment touchscreen 102 may provide user selection detection module 212 with a part of the image of the displayable content displayed on touchscreen 102. For example, a part of the graphic that extends to a predetermined distance beyond the edges of the user defined shape can be provided to the user selection detection module 212. FIG. 4 illustrates a user defined shape of a circle 402 on touchscreen 400 and displayable content as displayed on touchscreen 400 at the time of receiving user input defining the circle 402. In some embodiments, touchscreen 400 can provide user selection detection module 212 with shape 402 together with the entire image displayed on touchscreen 400. In another embodiment, shape 402 is provided together with an area 412 of the displayed image, where area 412 is determined as the area defined by a predetermined distance from the edges of the user defined shape 402. Thus, in various embodiments, either the touchscreen or user selection detection module 212, determines a shape, or an area defined by the determined shape in an image of the displayed content.

In step 304, an estimated selected content is determined, for example, by user selection detection module 212. In an embodiment, based on an area defined by a user defined shape on the touchscreen, and an image (or part of an image) corresponding to the displayable content displayed on the touchscreen at the time of receiving user input, user selection detection module 212 determines an estimated content. The estimated content can be determined based on several factors including, but not limited to, content that is located within the user defined shape, the extent to which content is located outside the user defined shape, the type of content, the resolution of the displayed image, the size of the shape, and the size of the display area of the touchscreen relative to the pointer and/or finger used to define the shape. Content, such as paragraphs of text, graphics, and the like, which are located entirely within the user defined shape are, in many embodiments, included in the estimated content. In general, embodiments employ an inclusive approach when determining the user specified content. Content, such as text paragraphs and graphics that are located partially within the user-defined shape can be included in the estimated content based on the type of content and other factors. For example, if substantially all of a paragraph of text or substantially all of a graphic is located within the area defined by the user, then an area containing that entire paragraph or graphic may be included in the estimated content. For example, a rule may be specified that if a text paragraph has more than a predetermined portion of the paragraph contained within the user-defined area, then an area including the entire paragraph is to be included in the estimated content. Rules are further described in relation to FIG. 7 below.

Other factors such as the resolution of the displayed image of the displayable content, relative sizes of the user defined shape, and the display area of the touchscreen, for example, can be used to determine the level of inclusiveness in determining the estimated content. For example, if the image of the content is displayed at a resolution above a predetermined threshold, then the portion of a text paragraph that must be contained within the user defined shape in order for the paragraph to be included in the estimated content can be lowered. For example, if at least a 40% portion of a paragraph was required to be within a user defined shape before it is considered to be added to the estimated content at a level of resolution of the displayed content, then at a higher resolution, a reduced portion of 20% may be required before the paragraph is included in the estimated content. In a like manner, when the relative difference in size between the size of the view area of the touchscreen and the defined shape is low, then an increased level of inclusiveness in adding content to the estimated selection may be chosen.

For example, text paragraphs 404, 406, 408 and 410, are partially contained within user-defined area 402, and user selection detecting module 212 is required to determine an estimated content. As shown in FIG. 4, paragraphs 404 and 406 appear to have more than a 50% portion contained within user defined shape 402, while paragraphs 408 and 410 appear to have less than a 50% portion contained within user defined shape 402. The other text paragraphs visible in touchscreen 400 appear clearly outside user-defined shape 402. Thus, user selection detecting module 212 can, for example, determine the estimated content to include text paragraphs 404 and 406. If, for example, the resolution level of the displayed content is greater than a predetermined level, then paragraphs 408 and 410, which have less that a 50% portion contained within the user defined shape 402, can be included in the estimated content in addition to paragraphs 404 and 406.

Figure 5:
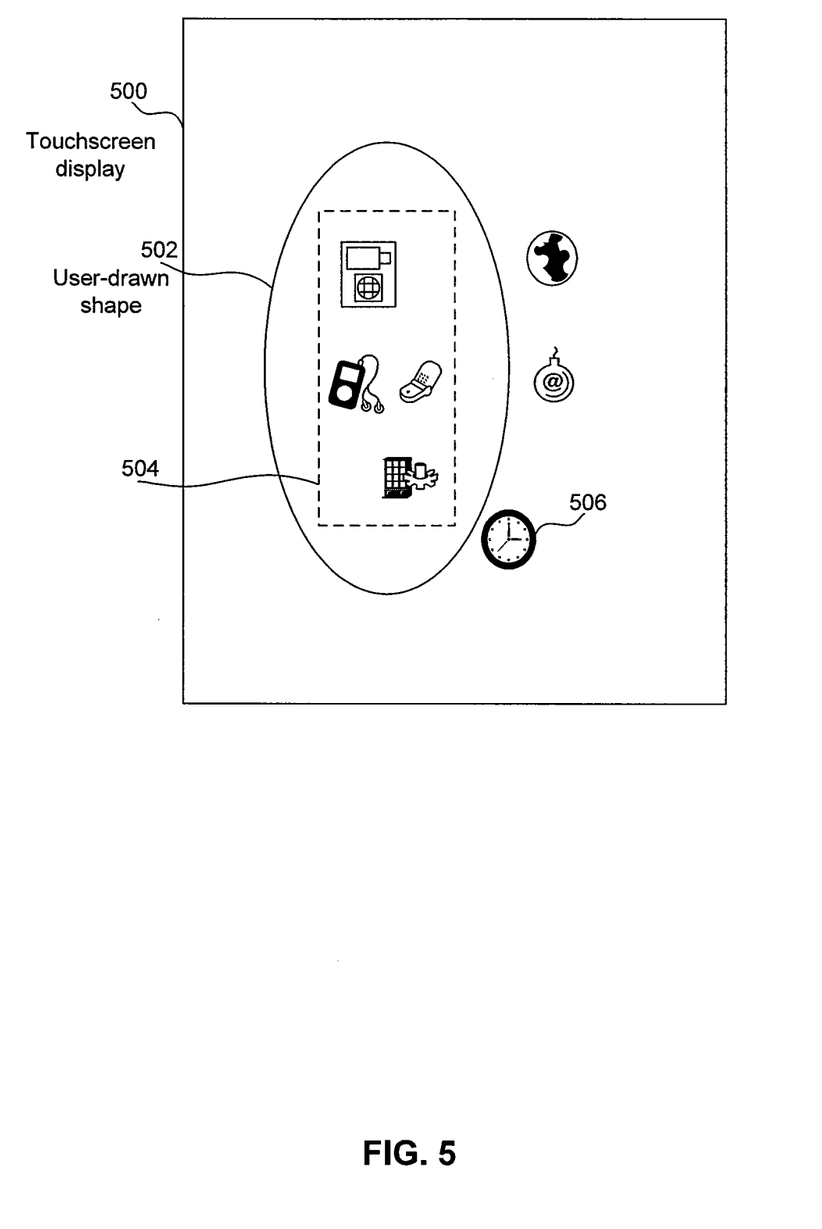
FIG. 5 shows a touchscreen wherein a user-defined shape indicates graphics content to be selected, according to an embodiment.

FIG. 5 shows another displayable content displayed in a touchscreen 500. Displayable content displayed in touchscreen 500 includes several graphics objects as shown. A user-defined oval shape 502 contains all of the graphic objects shown within area 504. Thus, the estimated content can include all of the graphics objects in area 504. Under certain conditions, such as if it is determined that the display on touchscreen 500 is at a high resolution and if it is also determined that other objects outside the user-defined shape 502 are within a predetermined short distance from shape 502, then such graphics objects may be included in the estimated selection. For example, it may be determined that graphics object 506 is within a threshold distance outside user defined shape 502, and thus can be included in estimated selected content.

Returning to FIG. 3, in step 306, the estimated selected content is displayed on the touchscreen. In an embodiment, the currently displayed content is cleared from the touchscreen and the estimated selected content is displayed. The estimated selected content can be displayed in magnified or zoomed-in form so that it is more clearly viewable and portions of it are more easily selectable by the user. Prior to magnifying and displaying the selected content on the touchscreen, the currently displayed content can be saved in a manner such that it can be retrieved for later use. For example, in each iteration of determining a new estimated selected content, the previously displayed content can be stored in temporary storage before the newly estimated selected content is displayed on the touchscreen. Saving the previously displayed content would enable the implementation of, for example, an "undo" function that can allow the user to undo one or more selections if an error is made.

In an embodiment, the estimated selected content is magnified based on the type of content. For example, if the estimated selected content includes both text and graphics objects, the text may be displayed in increased an increased font size, while the graphics objects are displayed by zooming-in to the relevant areas. In another embodiment, an optimal zoom level or magnification level is determined based on the size of the selected content (i.e. size of the area containing the estimated selected content) and the size of the touchscreen display area. The resolution at which the estimated selected content is to be displayed can also be a factor in determining the optimal level of magnification. For example, at higher resolutions larger areas of estimated selected content can be displayed.

Steps 308-310 enable the receiving of user input that, in an embodiment, can indicate one or more portions of deletable content within the currently displayed estimated selected content. In step 308, user input regarding the displayed estimated selected content is received. For example, the user can indicate if the currently displayed estimated selected content is the desired selection of the content or whether further refinement of the estimated selected content is required. The user can also indicate if one or more of the previous estimated content selections should be undone (reversed).

In step 310, if it is determined from the user input that the currently displayed estimated selected content is the desired selection of the content, the content selection process is completed. If so, in step 314, the current estimated selected content is considered as the desired selected content. For example, the desired selected content can be provided to an application, such as an electronic mail application or word processing application, to be used for display, further processing, or some other use. In one embodiment, when the user indicates that the currently displayed estimated selected content is the desired selection of the content, content refinement module 216 can send a message containing the desired content to an application that invoked the content selection module 210 to determine the desired content. For example, content selection module 210 may have been invoked by an email application when the user sought to cut and paste some content from a web page displayed in a browser. When the user indicates that the desired content has been selected, content selection module 210 returns the desired content to the requesting application which in this case is the email application and completes execution.

In step 310, the user input may indicate that the currently displayed content is the desired content by selecting from a set of menu choices, by selecting a button displayed on the touchscreen, or using any other type of predetermined means of indicating approval of the currently displayed content as the desired content. For example, in an embodiment, pressing of the "enter" key on a keyboard coupled to the touchscreen can be defined as approval of the currently displayed content as the desired content.

If, in step 310, it is determined that the current estimated selected content is to be further refined, then in step 312 the estimated selected content is further refined by removing deletable content. In an embodiment, in step 310, a user may indicate his choice to further refine by selecting a choice from a menu of options, by selecting a button on the touchscreen, or using any other predetermined means of indicating a choice to further refine selected content. In an embodiment, a user may indicate the choice to further refine the estimated selected content by simply proceeding to select parts of the currently displayed estimated selected content.

In an embodiment, the user selects a portion of the estimated selected content displayed on the touchscreen to be removed from the estimated selected content. The content to be removed (i.e., deletable content) can be indicated using means such as defining an area containing the content to be deleted, by selecting the content to be deleted, or like method.

In one embodiment, content to be removed is indicated by defining an area in the displayed current estimated selected content, where the defined area contains the content to be removed. For example, the user may use a finger, pixel, pen, or like object to draw a polygon, circle, or other shape substantially encompassing the content to be removed. The content within the user-defined shape in step 312 can be considered as deletable content, and can be deleted from the estimated selected content. The indication of content to be removed by defining a shape on the touchscreen in this step is different from using the user-defined shape to select content in steps 302-304. The different functionality for the same or similar user action of drawing a shape on a touchscreen can be configured in the appropriate processing modules, for example, by having at least two modes of operations: a content selection mode, and a content refinement mode. In content selection mode, upon detecting a user-defined shape the processing code proceeds to select content that the user desired to select. In content refinement mode, upon detecting a user-defined shape the processing code proceeds to determine content the user desires to remove from the estimated selected content.

In another embodiment, content to be removed may be indicated by selecting the content to be deleted, by, for example, highlighting the sentences to be deleted. The specific paragraphs of text to be deleted can be highlighted. Graphic objects to be deleted can be individually selected from the displayed estimated content. An embodiment may implement more than one means of indicating content to be removed. For example, an embodiment can provide the user with the choice of drawing a shape on the touchscreen or selecting individual segments of content, to indicate content to be removed from estimated selected content.

In step 312, the determined deletable content is removed from the estimated selected content, yielding a refined selected content. Subsequent to step 312, processing proceeds from step 306 with the refined estimated selected content. For example, in each iteration subsequent to the first iteration, step 306 magnifies and displays an estimated selected content that is refined by removing some content from the previous iteration's estimated selected content. Thus, steps 306-312 can be repeated enabling the user to iteratively display an estimated selected content in an optimized display form on the touchscreen and to further refine the estimated selected content by removing content using the optimized display form on the touchscreen. The iterative refinement of the selected content by deleting deletable content enables the user to conveniently use a finger, stylus, or other such object to select the desired content, without the cumbersome requirement of conventional content selection methods to precisely mark the desired content.

Figure 6:
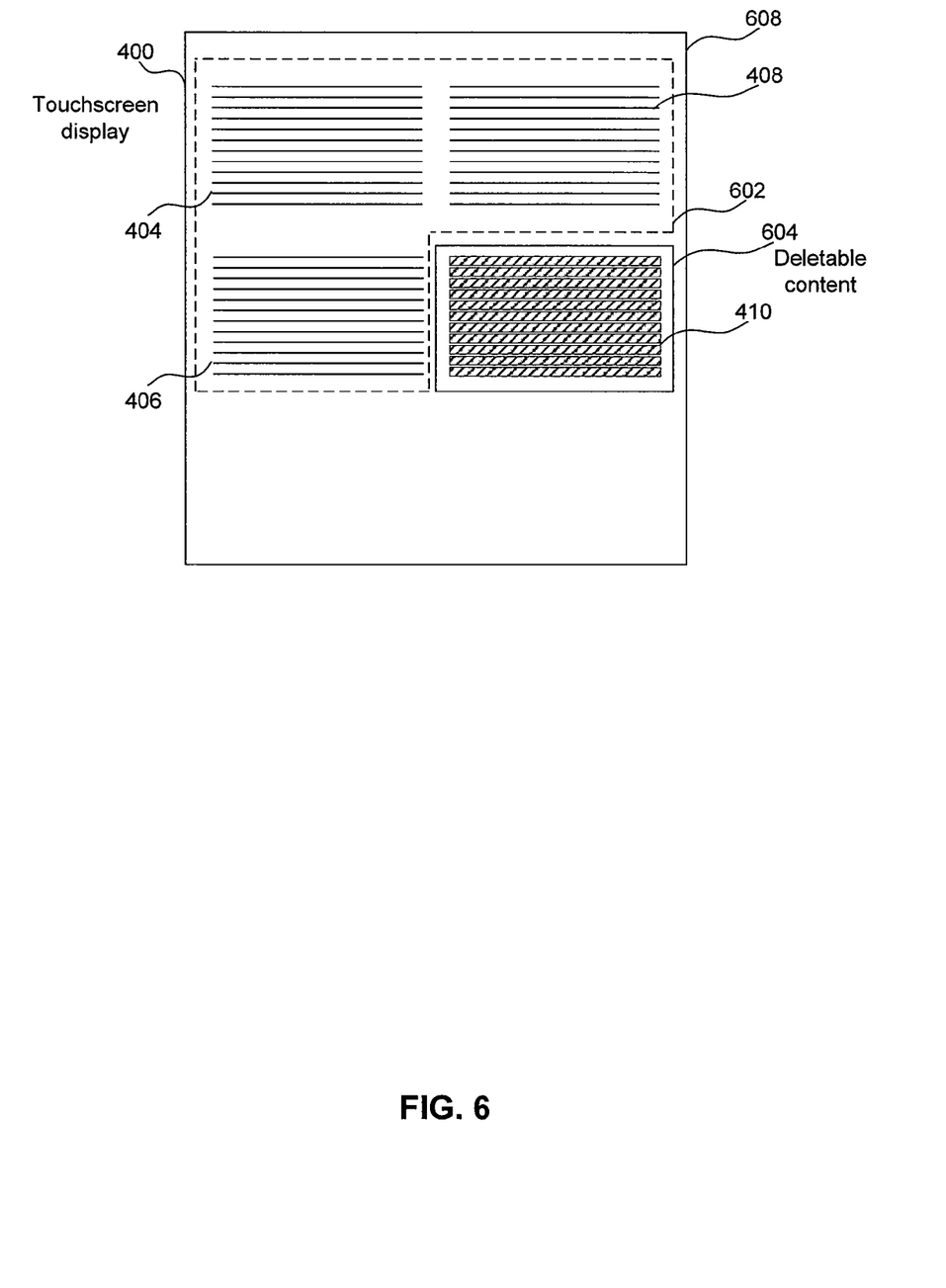
FIG. 6 shows a touchscreen in which a content selected previously by the user is displayed in a magnified form, and the user further indicates content to be deleted, according to an embodiment.

FIG. 6 illustrates, according to an embodiment, a display of estimated selected content. In FIG. 6, touchscreen display 400 is shown displaying the estimated selected content of text paragraphs 404, 406, 408, and 410, in magnified or zoomed-in form. As described in relation to FIG. 4 above, text paragraphs 404, 406, 408, and 410 may have been included in the estimated selected content based on the user-defined circle shape 402. As shown in FIG. 6, the estimated selected content is displayed in magnified or zoomed-in form using substantially all the display area of touchscreen 400. The magnified display of the estimated selected content presents the user with an enhanced view so that the user can specify certain portions of the estimated selected content that should be removed. For example, in FIG. 6 the user may specify that text paragraph 410 is to be removed by either drawing a rectangular shape 604 containing text paragraph 410 on the touchscreen, or by selecting text paragraph 410 by highlighting. Thus, after the user removes text paragraph 410, the estimated selected content for the next iteration of step 306 would be the area 602 containing text paragraphs 404, 406, and 408.

Figure 7:
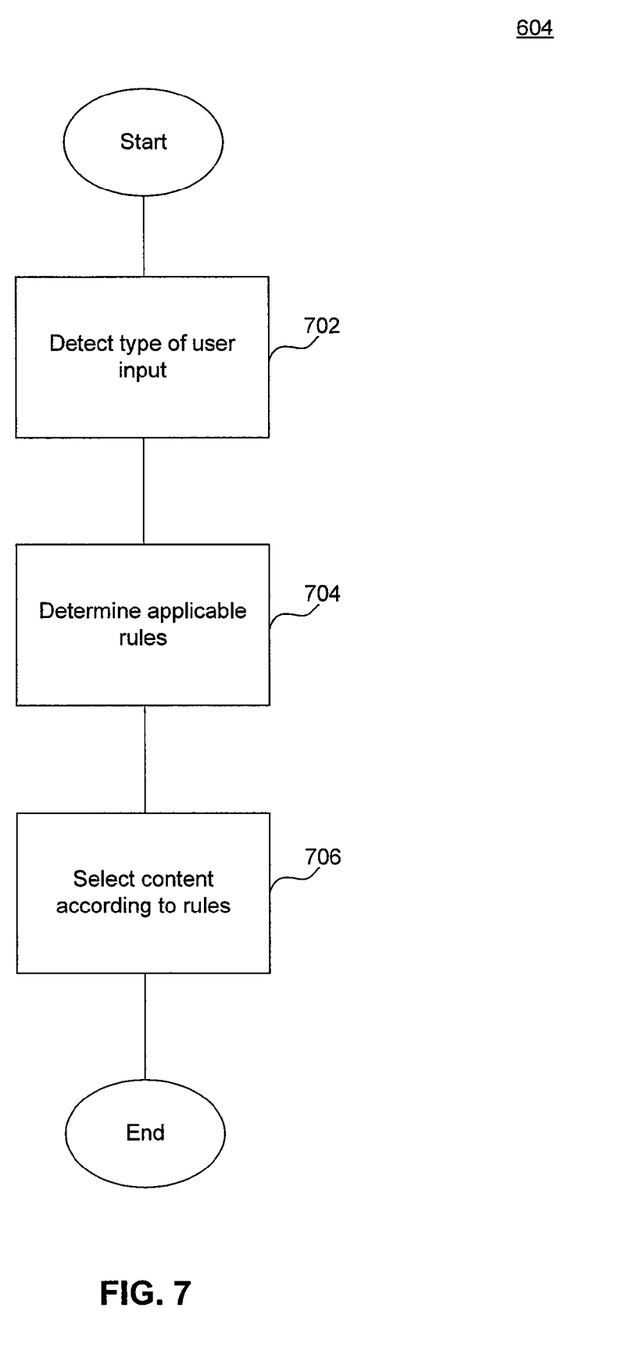
FIG. 7 is a flowchart of a process for determining the content indicated by the user by the drawing of a shape, according to an embodiment.

FIG. 7 illustrates, according to an embodiment, processing steps 702-706 associated with determining a selected content according to step 304 described above. In step 702, the type of user input is determined. The type of user input may be a regular shape such as a circle, oval, rectangle, square, triangle, or other polygon, or an irregular form. As described above with respect to step 304, the shape defined by the user on the touchscreen can be determined by the touchscreen or by user-selection detection module 212.

In step 704, one or more rules that are applicable to the determined type of user input and the type of content are determined. In an embodiment, content selection rules module 218 can select one or more predefined rules applicable to the determined type of user input and the type of content. For example, if the determined type of user input is a circle, then content selection rules module 218 can select a rule defined for user input type circle that includes in the estimated selected content any text or graphic object that is more than 50% inside the circle shape, and excludes from the estimated selected content any text of graphics object that is 50% or less inside the circle shape as deletable content. A further related rule for user input type circle may specify that, for example, if the resolution at which content is displayed is above a threshold for the size of the viewable area of a touchscreen, then objects that are more than 20% inside the circle shape are to be included in the estimated content.

Predefined rules to be used by content selection rules module 218 can be maintained in any form, including but not limited to, in a database such as a conventional database having separately definable and modifiable rules, or as one or more rules hard-coded into the processing logic of content selection rules module 218. For example, predefined rules 220 may be stored in storage 204 and made accessible to program logic including content selection rules module 218. Persons of skill in the art would understand that such rules can be specified, maintained, and accessed in many forms consistent with the teachings of this disclosure.

In step 706, an estimated content selection is made by applying one or more rules determined in step 704 to the displayed content. As described above with respect to step 304, user selection detection module 212 may receive part or all of an image of the displayed content along with user-defined shape information. Using the received image of the displayed content and applicable rules, an estimated selected content is determined in step 706.

As described above, embodiments improve the content selection process in computing devices that have incorporated touchscreen interfaces.

CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
 receiving, by a computing device, an indication of a first user input detected at a touchscreen, the first user input including a first gesture that defines a shape;
 determining, by the computing device and based on the shape, a selected portion of content displayed by the touchscreen;
 responsive to receiving the indication of the first user input, magnifying, by the computing device, the selected portion of the content displayed by the touchscreen;
 receiving, by the computing device, an indication of a second user input detected at the touchscreen, the second user input identifying one or more sub-portions of the selected portion of content displayed by the touchscreen; and
 responsive to receiving the indication of the second user input, determining, by the computing device, an updated selected portion of the content by at least deselecting the one or more sub-portions such that the selected portion of content no longer includes the one or more sub-portions.

2. The method of claim 1, wherein the first gesture is drawn using a finger or stylus.

3. The method of claim 2, wherein the first gesture is drawn using a continuous movement of the finger or stylus while making contact with the touchscreen.

4. The method of claim 1, wherein the determining the selected portion of content is based at least in part on at least one predetermined rule to determine the selected portion of content.

5. The method of claim 1, wherein the magnifying the selected portion of content comprises:
   magnifying the selected portion of content based on a predetermined portion of the content being located within the shape defined by the first gesture.

6. The method of claim 1, further comprising:
   repeating the steps of magnifying the selected portion of content, receiving a second user input, and deselecting one or more sub-portions, wherein magnified portions of content of each iteration are a subset of magnified portions of content of any previous iteration.

7. The method of claim 1, wherein the second gesture defines a second shape.

8. The method of claim 1, wherein the shape is a first shape and the one or more sub-portions are at least partially within a second shape, wherein the second shape is defined by the second user input.

9. The method of claim 1, wherein the second user input identifying one or more sub-portions comprises user input identifying content at one or more locations on the touchscreen.

10. The method of claim 1, wherein the magnifying comprises:
    displaying only the portions of content within the shape defined by the first gesture.

11. The method of claim 1, wherein the magnifying comprises:
    improving selectability of content within the shape defined by the first gesture.

12. The method of claim 1, further comprising:
    providing the portions of content to an application.

13. A system, comprising:
    a touchscreen; and
    at least one processor coupled to the touchscreen, wherein the at least one processor is configured to:
       receive an indication of a first user input detected at the touchscreen, the first user input including a first gesture that defines a shape;
       determine, based on the shape, a selected portion of content displayed by the touchscreen;
       responsive to receiving the indication of the first user input, magnify the selected portion of the content displayed by the touchscreen;
       receive an indication of a second user input detected at the touchscreen, the second user input identifying one or more sub-portions of the selected portion of content displayed by the touchscreen; and
       responsive to receiving the indication of the second user input, determine an updated selected portion of the content by at least deselecting the one or more sub-portions such that the selected portion of content no longer includes the one or more sub-portions.

14. The system of claim 13, wherein the first gesture is drawn using a finger or stylus.

15. The system of claim 13, wherein the processor is further configured to:
    use at least one predetermined rule to determine the selected portion of content.

16. The system of claim 13, wherein the processor is further configured to:
    repeat the steps of magnifying the selected portion of content, receiving a second user input, and deselecting one or more sub-portions, wherein magnified portions of content of each iteration are a subset of magnified portions of content of any previous iteration.

17. The system of claim 13, wherein the second gesture defines a second shape.

18. A non-transitory computer readable medium storing instructions wherein said instructions when executed cause at least one processor to implement a method comprising:
    receiving an indication of a first user input detected at a touchscreen, the first user input including a first gesture that defines a shape;
    determining, based on the shape, a selected portion of content displayed by the touchscreen;
    responsive to receiving the indication of the first user input, magnifying, by the computing device, the selected portion of the content displayed by the touchscreen;
    receiving an indication of a second user input detected at the touchscreen, the second user input identifying one or more sub-portions of the selected portion of content displayed by the touchscreen; and
    responsive to receiving the indication of the second user input, determining, by the computing device, an updated selected portion of the content by at least deselecting the one or more sub-portions such that the selected portion of content no longer includes the one or more sub-portions.

19. The system of claim 13 wherein the processor is further configured to:
    provide the selected portion of content to an application program operating on the processor after deselecting the one or more sub-portions of content.

* * * * *